US012591707B2

(12) United States Patent
Joshi et al.

(10) Patent No.: US 12,591,707 B2
(45) Date of Patent: Mar. 31, 2026

(54) PRIVACY PRESERVING INSIGHTS AND DISTILLATION OF LARGE LANGUAGE MODEL BACKED EXPERIENCES

(71) Applicant: Microsoft Technology Licensing, LLC, Redmond, WA (US)

(72) Inventors: Dhruv Joshi, Bellevue, WA (US); Robert Sim, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 148 days.

(21) Appl. No.: 18/361,600

(22) Filed: Jul. 28, 2023

(65) Prior Publication Data

US 2025/0036800 A1 Jan. 30, 2025

(51) Int. Cl.

*G06F 21/62* (2013.01)
*G06F 40/20* (2020.01)
*G06N 20/00* (2019.01)

(52) U.S. Cl.

CPC .......... *G06F 21/6245* (2013.01); *G06F 40/20* (2020.01); *G06N 20/00* (2019.01)

(58) Field of Classification Search

CPC ..... G06F 21/6245; G06F 40/20; G06N 20/00; G06N 3/045

See application file for complete search history.

(56) References Cited

U.S. PATENT DOCUMENTS

| | | | | |
|---|---|---|---|---|
| 11,244,015 | B1 * | 2/2022 | Zhuang | G06F 16/355 |
| 12,008,026 | B1 * | 6/2024 | Sanz | G06F 16/3347 |
| 2015/0100987 | A1 * | 4/2015 | Whitman | H04N 21/251 725/53 |
| 2021/0406474 | A1 * | 12/2021 | Jalali | G06F 40/30 |
| 2023/0017165 | A1 * | 1/2023 | Walters | G06N 3/047 |
| 2024/0095445 | A1 * | 3/2024 | Sharma | G06F 40/166 |
| 2024/0119170 | A1 * | 4/2024 | Xu | G06F 21/6245 |
| 2024/0202360 | A1 * | 6/2024 | Wang | G06N 3/045 |
| 2024/0379226 | A1 * | 11/2024 | Annangi | G06N 3/084 |
| 2024/0427810 | A1 * | 12/2024 | Tishbi | G06F 16/3344 |
| 2025/0086785 | A1 * | 3/2025 | Sellergren | G06V 10/776 |

* cited by examiner

*Primary Examiner* — Olugbenga O Idowu
(74) *Attorney, Agent, or Firm* — NovoTechIP International PLLC

(57) ABSTRACT

A data processing system implements receiving a plurality of natural language prompts for a language model; storing the prompts in a privacy protecting datastore in which the prompts are inaccessible from outside of the privacy protecting datastore; analyzing the prompts stored to generate embedding vectors representing the plurality of natural language prompts; storing the embedding vectors in the privacy protecting datastore; analyzing the embedding vectors using a clustering algorithm to generate clusters of related embedding vectors in the privacy protecting datastore; generating, for each cluster, theme information summarizing the embedding vectors of the cluster; and storing the theme information associated with each cluster of the plurality of clusters in a second datastore outside of the privacy protecting datastore, the second datastore being accessible for querying the data stored therein.

18 Claims, 9 Drawing Sheets

600

602
Receive a plurality of natural language prompts for a first language model

604
Store the plurality of natural language prompts in a privacy protecting datastore in which the natural language prompts are inaccessible from outside of the privacy protecting datastore once stored in the privacy protecting datastore 606
Analyze the natural language prompts stored in the privacy protecting datastore using a second language model associated with the privacy protecting datastore to generate embedding vectors representing the plurality of natural language prompts 608
Store the embedding vectors in the privacy protecting datastore 610
Analyze the embedding vectors using a privacy preserving clustering algorithm to generate clusters of related embedding vectors in the privacy protecting datastore 612
Generate, for each cluster of at least a subset of the clusters of related embedding vectors, theme information summarizing the embedding vectors of the cluster 614
Store the theme information associated with each cluster of the plurality of clusters in a second datastore outside of the privacy protecting datastore, the second datastore being accessible for querying the data stored therein

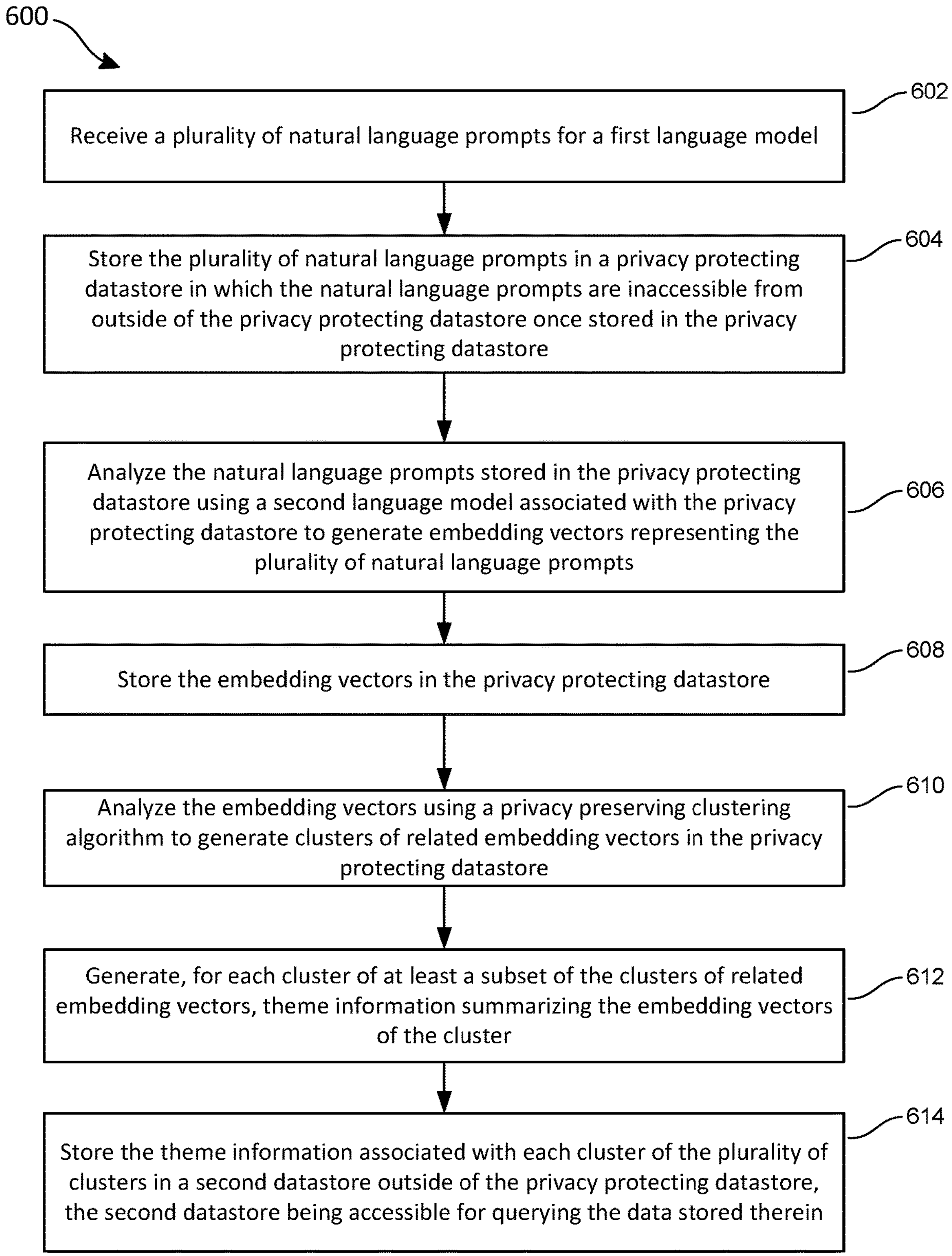

672
Receive natural language prompts for a first language model

674
Process the natural language prompts using prompt anonymization pipeline configured to store the natural language prompts in a datastore that is inaccessible from outside of the prompt anonymization pipeline, the prompt anonymization pipeline being configured to anonymize the natural language prompts in the datastore by:

676
Generate embeddings for the natural language prompts

678
Analyze the embeddings using a privacy preserving clustering algorithm to identify clusters of related natural language prompts 680
Analyze at least a subset of the clusters using a third language model trained to summarize the subject matter of the embeddings into a theme associated with the cluster 682
Store the theme associated with each cluster of the at least a subset of the clusters in an anonymized prompt datastore 684
Receive a query for anonymized prompt information from a client device 686
Execute the query on the anonymized prompt datastore to obtain query results 688
Providing the query results to the client device

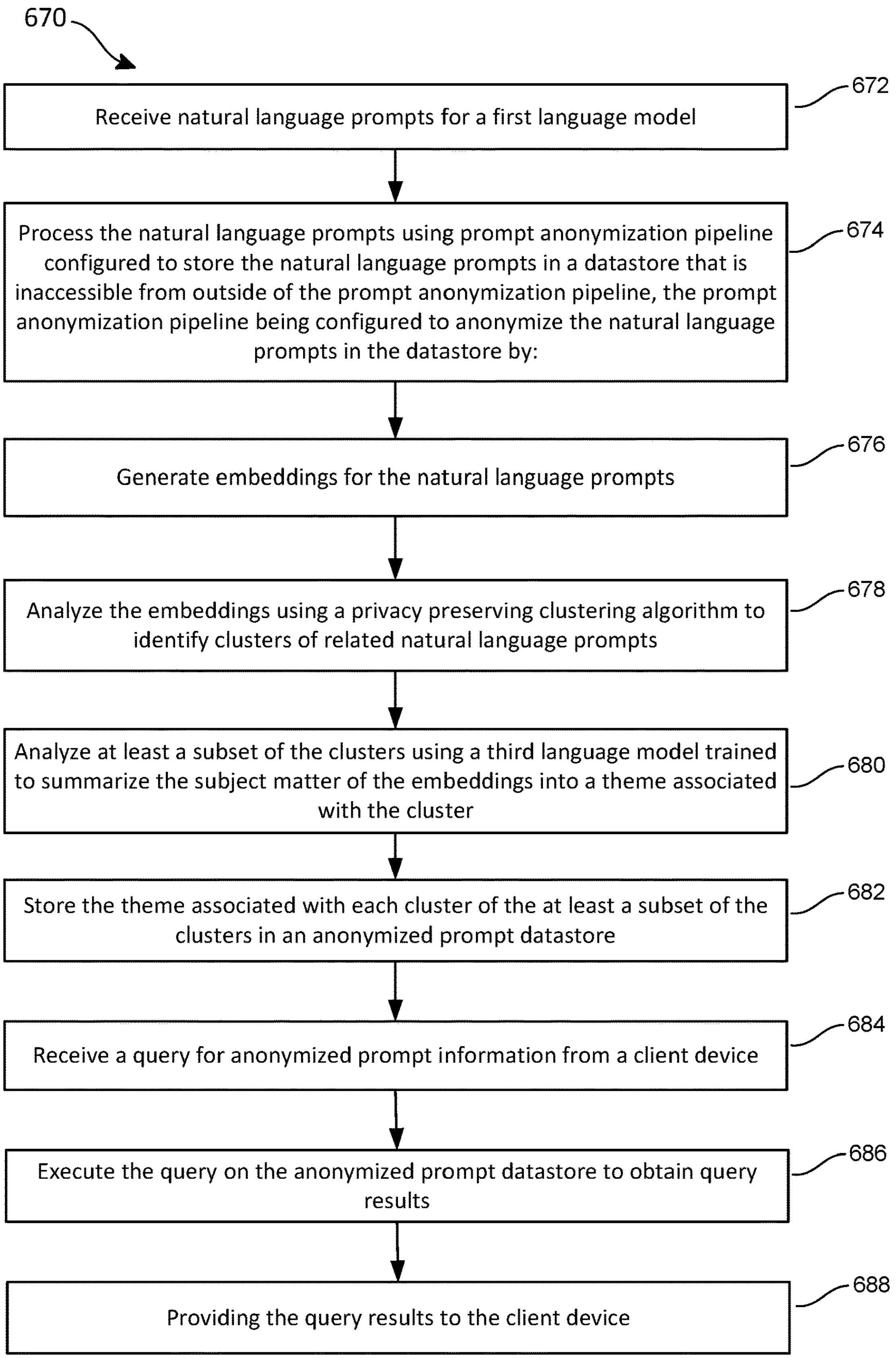

FIG. 6B

PRIVACY PRESERVING INSIGHTS AND DISTILLATION OF LARGE LANGUAGE MODEL BACKED EXPERIENCES

BACKGROUND

Developers of language models can derive useful insights into how the models are being utilized by users by examining the prompts that users present to the model. However, these prompts may include sensitive customer data. Therefore, the prompts are typically unavailable for developers to analyze so that they can develop a better understanding of how the users are utilizing the model. Consequently, it is difficult for model developers to train new models and/or develop other tools associated with the model that are directed to the most common use cases. Hence, there is a need for improved systems and methods that provide a technical solution for providing developers of language models with insights into the types of prompts that users typically submit to the model while preserving the privacy of the users.

SUMMARY

An example data processing system according to the disclosure includes a processor and a machine-readable medium storing executable instructions. The instructions when executed cause the processor alone or in combination with other processors to perform operations including receiving a plurality of natural language prompts for a first language model; storing the plurality of natural language prompts in a privacy protecting datastore in which the natural language prompts are inaccessible from outside of the privacy protecting datastore once stored in the privacy protecting datastore; analyzing the natural language prompts stored in the privacy protecting datastore to generate embedding vectors representing the plurality of natural language prompts; storing the embedding vectors in the privacy protecting datastore; analyzing the embedding vectors using a privacy preserving clustering algorithm to generate clusters of related embedding vectors in the privacy protecting datastore; generating, for each cluster of at least a subset of the clusters of related embedding vectors, theme information summarizing the embedding vectors of the cluster; and storing the theme information associated with each cluster of the plurality of clusters in a second datastore outside of the privacy protecting datastore, the second datastore being accessible for querying the data stored therein.

An example method implemented in a data processing system includes receiving a plurality of natural language prompts for a first language model; storing the plurality of natural language prompts in a privacy protecting datastore in which the natural language prompts are inaccessible from outside of the privacy protecting datastore once stored in the privacy protecting datastore; analyzing the natural language prompts stored in the privacy protecting datastore to generate embedding vectors representing the plurality of natural language prompts; storing the embedding vectors in the privacy protecting datastore; analyzing the embedding vectors using a privacy preserving clustering algorithm to generate clusters of related embedding vectors in the privacy protecting datastore; generating, for each cluster of at least a subset of the clusters of related embedding vectors, theme information summarizing the embedding vectors of the cluster; and storing the theme information associated with each cluster of the plurality of clusters in a second datastore outside of the privacy protecting datastore, the second datastore being accessible for querying the data stored therein.

An example data processing system according to the disclosure includes a processor and a machine-readable medium storing executable instructions. The instructions when executed cause the processor alone or in combination with other processors to perform operations including receiving natural language prompts for a first language model; processing the natural language prompts using prompt anonymization pipeline configured to store the natural language prompts in a datastore that is inaccessible from outside of the prompt anonymization pipeline, the prompt anonymization pipeline being configured to anonymize the natural language prompts in the datastore by: generating embeddings for the natural language prompts; analyzing the embeddings using a privacy preserving clustering algorithm to identify clusters of related natural language prompts; analyzing at least a subset of the clusters using a third language model trained to summarize the subject matter of the embeddings into a theme associated with the cluster; and storing the theme associated with each cluster of the at least a subset of the clusters in an anonymized prompt datastore; receiving a query for anonymized prompt information from a client device; executing the query on the anonymized prompt datastore to obtain query results; and providing the query results to the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6A is a flow chart of an example process for anonymizing prompts to a language model according to the techniques disclosed herein.

FIG. 6B is a flow chart of another example process for anonymizing prompts to a language model according to the techniques disclosed herein.

DETAILED DESCRIPTION

Systems and methods for providing privacy preserving insights into the usage of a language model by anonymizing prompts provided to the language model using privacy preserving algorithms to anonymize the prompts. These systems and methods address the technical problems associated with current solutions for monitoring the prompts that users present to the language model. These prompts may contain sensitive information. However, these prompts can provide useful insights into how users are utilizing the language model. Current solutions prevent model developers and other such users from accessing the prompts that are submitted by users, which preserves the privacy of the users but prevents the model developers from gaining important insights into how the language model is being used. The techniques herein provide a technical solution to this problem by implementing a prompt anonymization pipeline that stores the prompts submitted to a language model in a privacy preserving datastore that is inaccessible to human users to preserve the privacy of the users who have submitted prompts to the language model. The prompts are analyzed and anonymized within the privacy preserving datastore to generate anonymized prompt data that do not compromise the privacy of the users who submitted the prompts to the language model. A technical benefit of this approach is that the developers can obtain valuable insights into how the language model is being used from the anonymized prompt data without having access to the original prompts. Furthermore, the techniques herein can be used to distill child models from the language model that perform similarly to the source language model but require significantly fewer computing resources to execute than the source language model. Another technical benefit of the systems and methods provided herein also provide privacy preserving distillation of the language model into a child model that requires fewer computing resources to implement. These and other technical benefits of the techniques disclosed herein will be evident from the discussion of the example implementations that follow.

Figure 1:
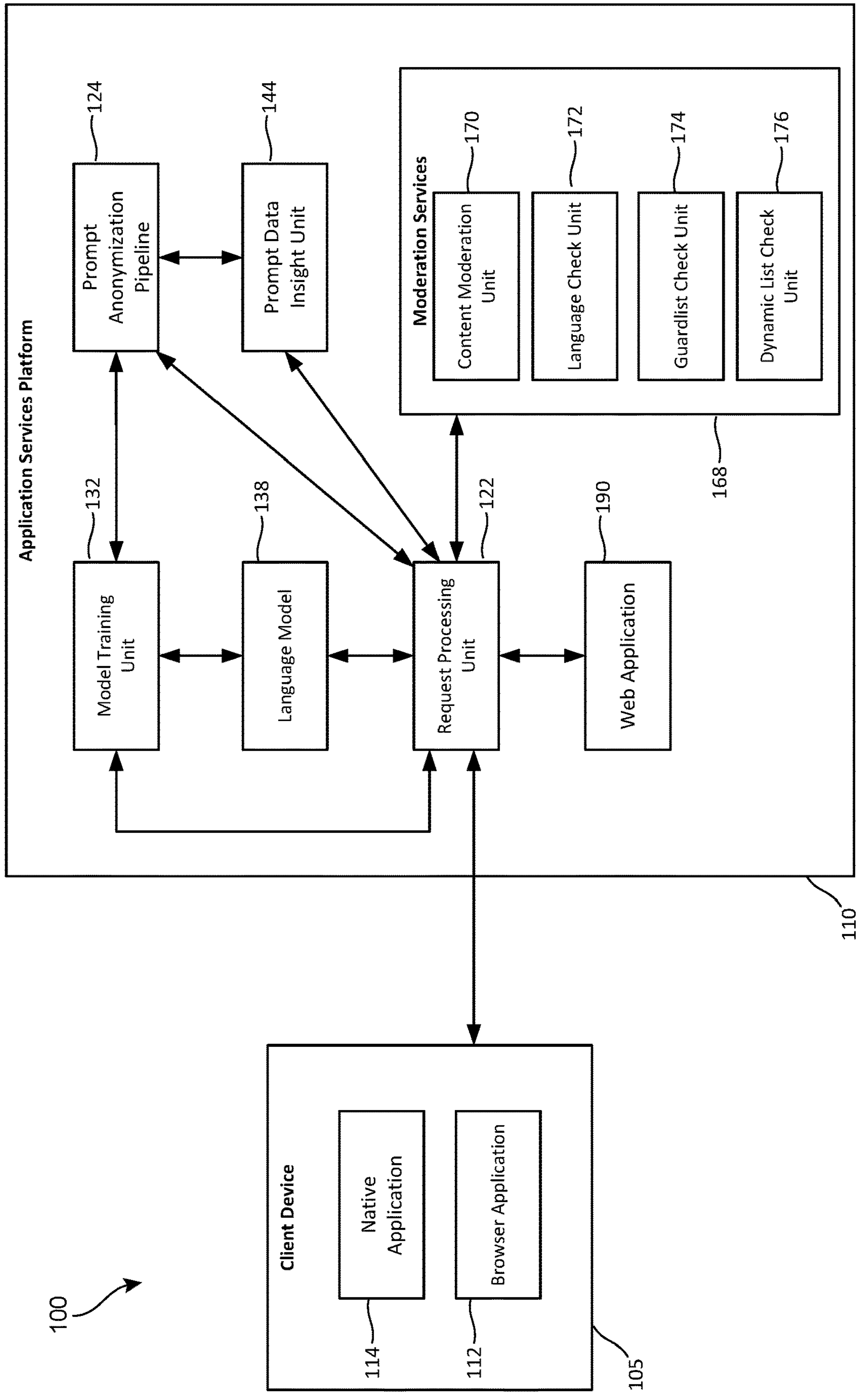
FIG. 1 is a diagram of an example computing environment in which the privacy preserving techniques for analyzing user prompts to a language model described herein may be implemented.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to presentation applications, word processing applications, web site authoring applications, collaboration platforms, communications platforms, and/or other types of applications in which users may create, view, and/or modify various types of electronic content. In the implementation shown in FIG. 1, the application services platform 110 utilizes a language model 138 to provide a least a portion of the services provided by the application services platform 110. Additional details of the language model 138 are discussed in detail below. The client device 105 and the application services platform 110 communicate via network connection. The network may be a combination of one or more public and/or private networks and may be implemented at least in part by the Internet.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize service provided by the application services platform 110.

The client device 105 includes a native application 114 and a browser application 112. The native application 114 is a web-enabled native application, in some implementations, that enables users to view, create, and/or modify electronic content. The web-enabled native application utilizes services provided by the application services platform 110 including but not limited to creating, viewing, and/or modifying various types of electronic content and obtaining templates for creating and/or modifying the electronic content. In other implementations, the browser application 112 is used for accessing and viewing web-based content provided by the application services platform 110. In such implementations, the application services platform 110 implements one or more web applications, such as the web application 190, that enables users to view, create, and/or modify electronic content and to obtain template recommendations for creating and/or modifying the electronic content. The application services platform 110 supports both web-enabled native applications and a web application in some implementations, and the users may choose which approach best suits their needs.

The application services platform 110 includes a request processing unit 122, a language model 138, a moderation services 168, a model training unit 132, a prompt anonymization pipeline 124, and a prompt data insight unit 144.

Figure 2:
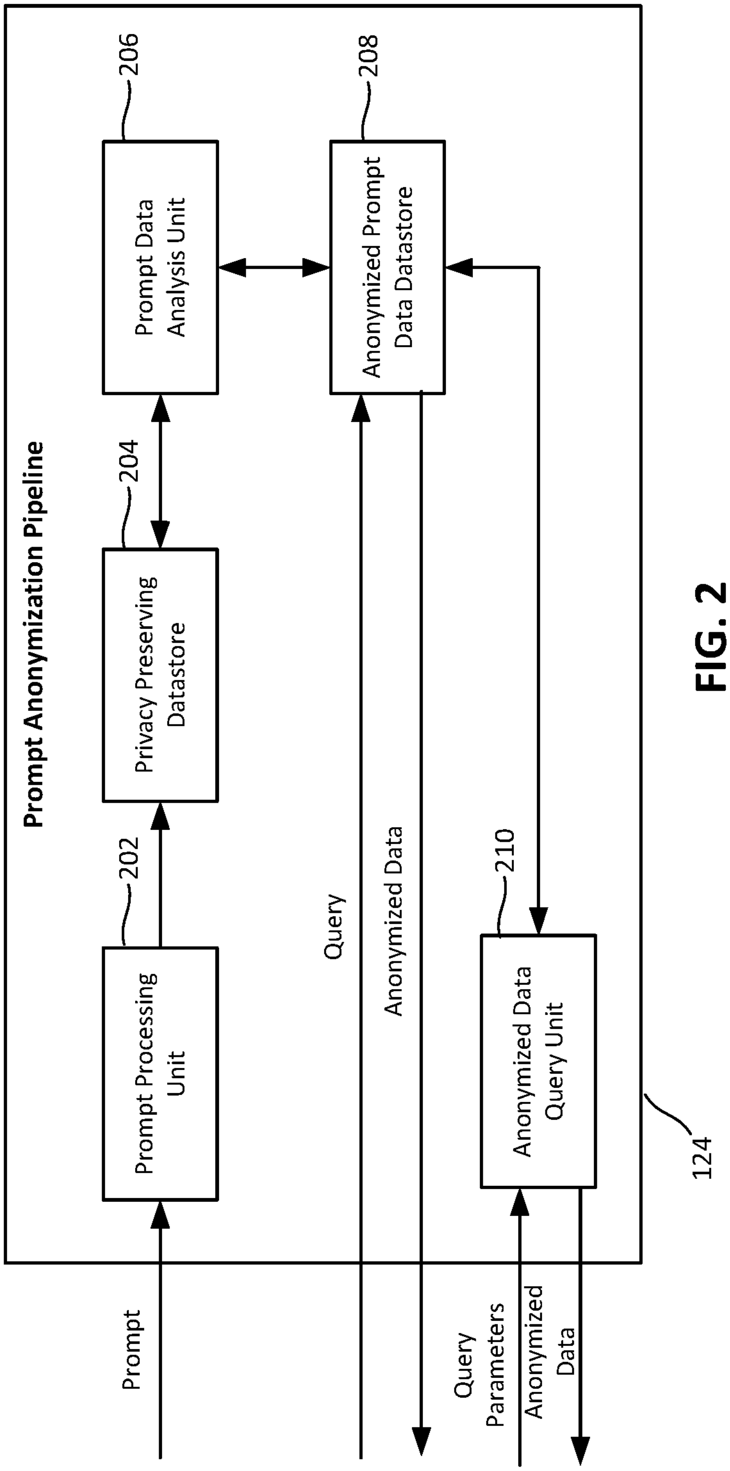
FIG. 2 is a diagram showing an example implementation of the prompt anonymization pipeline of the application services platform shown in FIG. 1.

The request processing unit 122 is configured to receive requests from the native application 114 of the client device 105 and/or the web application 190 of the application services platform 110. The request processing unit 122 processes user requests. The requests may include but are not limited to requests to create, view, and/or modify various types of electronic content and/or obtaining templates for creating and/or modifying the electronic content. These requests may include prompts for the language model 138 that have been entered by a user into a user interface of the native application 114 or the web application 190 via the browser application 112. The request processing unit 122 provides the prompt as an input to the language model 138 in response to such requests and also provides the prompt to the prompt anonymization pipeline 124 for processing according to the techniques provided herein. The request processing unit 122 also processes requests from administrators of the application services platform 110. These requests can include requests to retrain the language model 138, requests to distill a child model from the language model 138. The request processing unit 122 also coordinates communication and exchange of data among components of the application services platform 110 as discussed in the examples which follow. An example implementation of the prompt anonymization pipeline 124 is shown in FIG. 2.

The language model 138 is a machine learning model trained to generate textual content in response to a prompt received from the client device 105 via the native application 114 or from the web application 190 via the browser application 112. The prompt is a natural language prompt that requests that the language model 138 generate the textual content. The type of content generated may vary from implementation to implementation. In a non-limiting example, the generated textual content may include one or more sentences or paragraphs of textual content on a particular topic included in the prompt, structured or semi-structured instructions for rendering a slide or slides for a presentation, a spreadsheet, a chart, and/or other types of textual content. However, the techniques herein may be implemented by the prompt anonymization pipeline 124 regardless of how the language model 138 is being utilized on the application services platform 110. The language model 138 is implemented using a large language model (LLM) in some implementations. Examples of such models include but not limited to a Generative Pre-trained Transformer 3 (GPT-3), or GPT-4 model. Other implementations may utilize other models or other generative models to generate the content in response to a prompt received from a user via the client device 105.

The request processing unit 122 can receive a request from the native application 114 or the web application 190 to train a new instance of the language model 138, to refine the training of the language model 138, or to distill a child model from the language model 138. The request may be received from an administrator of the application services platform 110 or other authorized user to train a new instance of the language model 138, to refine the training of the language model 138, or to distill a child model from the language model 138. An example implementation of the model training unit 132 shown in FIG. 4, which is described in detail in the example implementations which follow.

The moderation services 168 analyze the textual prompts received from the native application 114 and/or the web application 190 and content generated by the language model 138 to ensure that potentially objectionable or offensive content is not generated or utilized by the application services platform 110. If potentially objectionable or offensive content is detected, the moderation services 168 provides a blocked content notification to the client device 105 indicating that the prompt and/or content generated by the language model 138 included content that is blocked.

The moderation services 168 performs several types of checks on the prompt provided by the user and/or content generated by the language model 138. The content moderation unit 170 is implemented by a machine learning model trained to analyze the textual inputs to perform a semantic analysis on the content to predict whether the content include potentially offensive language. The language check unit 172 performs another check on the content using a second model configured to analyze the words and/or phrase used in textual content to identify potentially offensive language. The guard list check unit 174 is configured to compare the language used in the content with a list of prohibited terms including known offensive words and/or phrases. The dynamic list check unit 176 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guard list as the guard list is updated. The specific checks performed by the moderation services 168 may vary from implementation to implementation. If one or more of these checks determines that the prompt and/or the textual content generated by the language model 138 includes offensive content, the moderation services 168 can notify the application services platform 110 that some action should be taken.

In some implementations, the moderation services 168 generates a blocked content notification, which is provided to the client device 105. The native application 114 or the web application 190 receives the notification and presents a message on a user interface of the application that the request received by the request processing unit 122 could not be processed. The user interface provides information indicating why the blocked content notification was issued in some implementations. The user may attempt to refine the prompt to remove the potentially offensive content. A technical benefit of this approach is that the moderation services 168 provides safeguards against both user-created and model-created content to ensure that prohibited offensive or potentially offensive content is not included in a content included in the prompt and/or recommended to the user.

Figure 5:
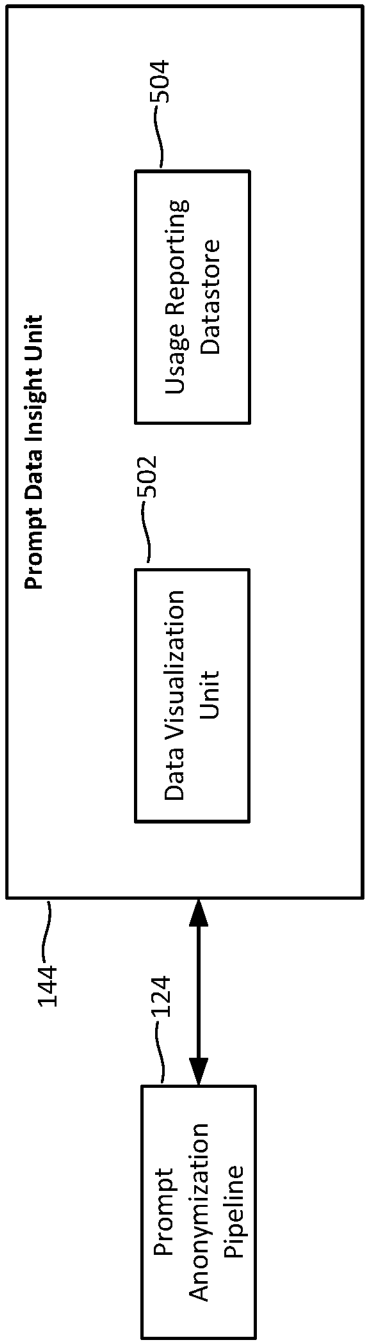
FIG. 5 is a diagram showing an example implementation of the prompt data insight unit of the application services platform shown in FIG. 1.

The prompt data insight unit 144 provides tools for analyzing the anonymized prompt data generated by the prompt anonymization pipeline 124. An example implementation of the prompt data insight unit 144 is shown in FIG. 5.

FIG. 2 is a diagram showing an example implementation of the prompt anonymization pipeline 124 of the application services platform shown in FIG. 1. The prompt anonymization pipeline 124 includes a prompt processing unit 202, a privacy preserving datastore 204, a prompt data analysis unit 206, an anonymized prompt data datastore 208, and an anonymized data query unit 210.

The prompt processing unit 202 is configured to receive a natural language prompt from the request processing unit 122 of the application services platform 110. The prompt processing unit 202 may preprocess the natural language prompt to reformat or otherwise standardize the information to be included in the prompt to a standardized format before storing the prompt in the privacy preserving datastore 204. For example, the prompt processing unit 202 may remove extraneous spaces, correct punctuation and/or capitalization, and/or perform other formatting updates on the prompt before storing the prompt in the privacy preserving datastore 204.

The privacy preserving datastore 204 is a persistent datastore stored in the memory of the application services platform 110. The privacy preserving datastore 204 is configured to prevent human users or unauthorized software from accessing the prompt information that has been stored therein. This approach ensures that the prompt data can be added to the privacy preserving datastore 204 without violating the privacy of the users who submitted the prompts to the application services platform 110. The prompt anonymization pipeline 124 permits prompt data to be written to the privacy preserving datastore 204 but not read or exported from outside of the prompt anonymization pipeline 124 once the data has been written to the privacy preserving datastore 204.

In some implementations, the privacy preserving datastore 204 is configured to automatically discard prompt data once the data has been used to generate anonymized prompt data. In other implementations, the privacy preserving datastore 204 is configured to delete prompt data that is older than a deletion threshold provide storage space in the privacy preserving datastore 204 for new prompt information and/or for regulatory compliance. In yet other implementations, the privacy preserving datastore 204 is configured to delete older data in a first-in first-out manner in response to the amount of prompt data stored in the privacy preserving datastore 204 reaching a storage capacity threshold. These various cleanup processes are performed automatically, because users are unable view the prompt information stored in the datastore to protect the privacy of the users submitting the prompts to the language model 138. In some implementations, administrator is able to configure the various thresholds used to determine when to permanently delete the prompt data to ensure that the privacy preserving datastore 204 has sufficient capacity for new prompt information.

The prompt anonymization pipeline 124 analyzes and anonymizes the prompt data stored in the privacy preserving datastore 204 using the prompt data analysis unit 206. The prompt data analysis unit 206 accesses the prompt data stored in the privacy preserving datastore 204, determines embedding vectors for the prompt data, analyzes the embeddings to identify clusters, and summarizes the clusters to generate anonymized prompt data to be stored in the anonymized prompt data datastore 208. The prompt anonymization pipeline 124 may apply one or more techniques to ensure that the summarized clusters meet a specified standard for anonymization. These techniques may include but are not limited to personal identifiable information (PII) scrubbing, k-user-anonymization, and/or differentially private techniques. An example implementation of the prompt analysis unit 206 is shown in FIG. 3, which is described in detail in the examples which follow.

The anonymized prompt data datastore 208 is a persistent datastore stored in a memory of the application services platform 110. The prompt anonymization pipeline 124 permits queries to be submitted to the prompt anonymization pipeline 124 to access the anonymized prompt data stored in the anonymized prompt data datastore 208. The data stored in the anonymized prompt data datastore 208 has been anonymized so that the information obtained from the anonymized prompt data datastore 208 can be used to show general usage patterns or themes in the prompts that users have submitted to the language model 138 without disclosing any specific information from any one prompt that could be traced back to a specific user. In some implementations, the data stored in the anonymized prompt data datastore 208 may be encrypted or otherwise obfuscated to prevent the data from being accessible outside of the anonymized prompt data datastore 208.

The anonymized data query unit 210 receives query parameters from the native application 114 and/or the web application 190 and formulates a query to be executed on the anonymized prompt datastore 208. The native application 114 and/or the web application 190 provide a user interface for model developers, administrators, and/or other authorized users to submit queries for anonymized data stored in the anonymized prompt datastore 208 in some implementations. The anonymized data query unit 210 supports applications that provide query parameters to the request processing unit 122 of the application services platform 110, and the request processing unit 122 provides the query parameters to the prompt anonymization pipeline 124. The query results include anonymized data from the anonymized prompt data datastore 208, and the anonymized data query unit 210 provides the query results to the request processing unit 122 to be forwarded to the native application 114 or the web application 190 which initiated the query. In some implementations, the native application 114 and/or the web application 190 formulate the query and send the query to the request processing unit 122. In such implementations, the request processing unit 122 provides the query to the anonymized prompt data datastore 208 for processing, and the query results are provided by the anonymized prompt data datastore 208 to the request processing unit 122. The request processing unit 122 forwards the anonymized prompt data to the native application 114 or the web application 190 which initiated the query.

Figure 3:
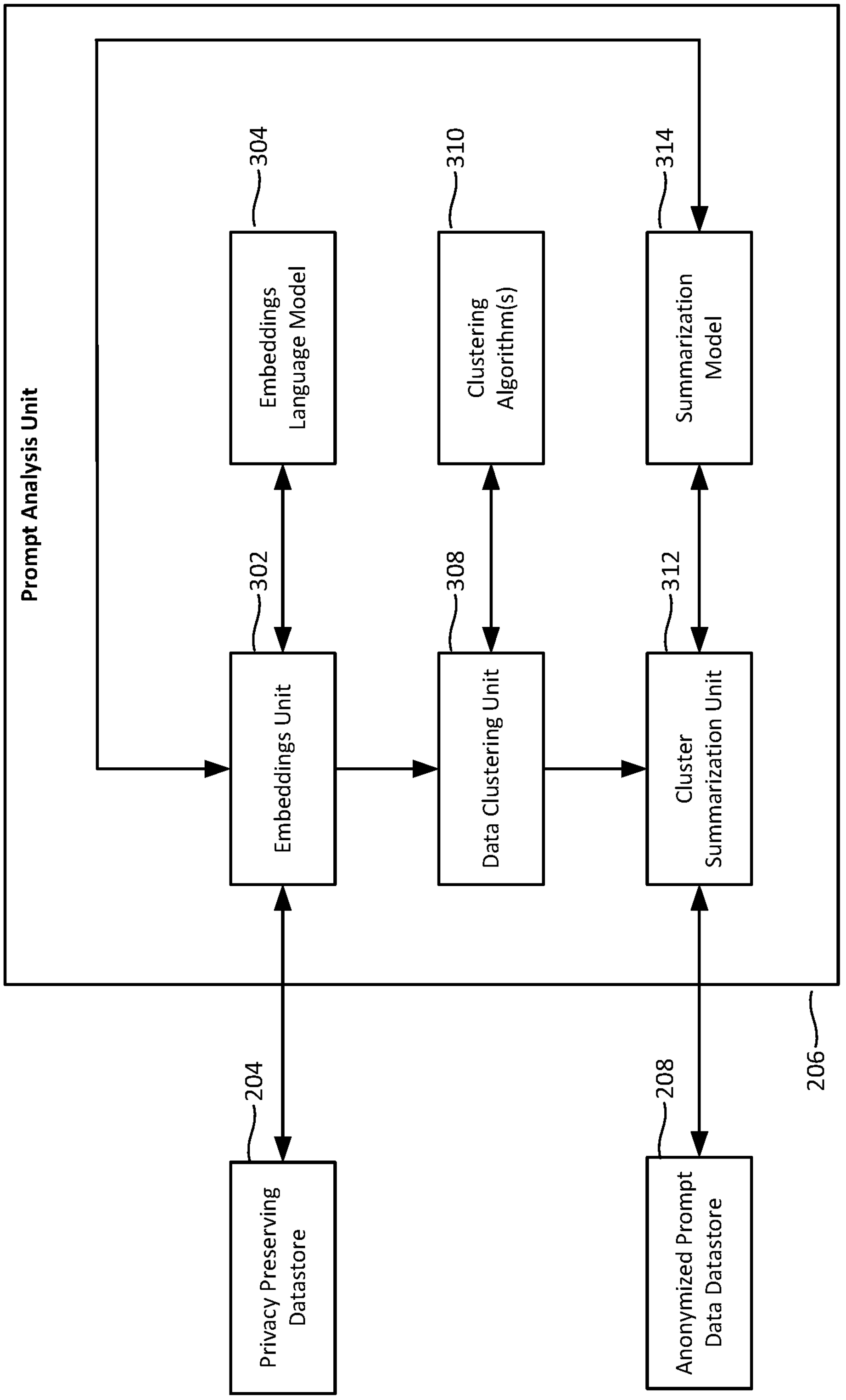
FIG. 3 is a diagram showing an example implementation of the prompt data analysis unit of the prompt anonymization pipeline shown in FIGS. 1 and 2.

FIG. 3 is a diagram showing an example implementation of the prompt data analysis unit 206 of the prompt anonymization pipeline 124 shown in FIGS. 1 and 2. The prompt data analysis unit 206 includes an embeddings unit 302, an embeddings language model 304, a data clustering unit 308, one or more privacy preserving clustering algorithms 310, a cluster summarization unit 312, a summarization model 314.

The embeddings unit 302 is configured to access the prompt information stored in the privacy preserving datastore 204 and to provide each prompt as an input to the embeddings language model 304 to obtain corresponding embeddings vectors. The embeddings language model 304 is a natural language model (NLP) that is configured to analyze a textual input and to output embeddings vectors comprising a numerical representation of the text of the prompt. Various models can be used to implement the embeddings language model 304, including but not limited to Word2Vec or BERT. Word2Vec embeddings do not take into consideration the word position within the text of the prompt while BERT embeddings takes the index representing the position of each word in the text of the prompt as an input when determining the embeddings. Other implementations can utilize other language models and/or other algorithms to generate the embeddings.

The data clustering unit 308 analyzes the embedding vectors using one or more privacy preserving clustering algorithms 310. The privacy preserving clustering algorithms 310 group embedding vectors representing the user prompts into groups having similar characteristics. In some implementations a k-means clustering algorithm that partitions the embedding vectors into k clusters in which each embedding vector belongs to a cluster having a nearest mean to the embedding vector. The value k is an integer value greater than 2. In other implementations, other clustering algorithms may be utilized. The privacy preserving clustering algorithm applies privacy-preserving techniques, such as but not limited to differential privacy. personal identifiable information (PII) scrubbing, and/or k-user anonymity in some implementations.

The cluster summarization unit 312 utilizes the summarization model 314 to summarize the embeddings associated with at least a subset of the clusters to determine a "theme" representing the subject matter of the cluster. In some implementations, the cluster must satisfy a cluster threshold value M, and the cluster summarization unit 312 only selects clusters that include at least M embedding vectors. The summarization model 314 is a language model trained to receive embeddings associated with the text prompts and to generate a theme representing the subject matter of the cluster.

The summarization model 314 uses differential privacy (DP) in some implementations to ensure that the themes associated with each cluster to be output are anonymous and do not include any information that can be attributed to a particular prompt provided by a particular user. DP injects noise into the dataset to ensure that no personal information is included in the themes output by the model. DP can be used with an LLM to inject noise into the training process or into the model's outputs to ensure that individual contributes of source textual prompts cannot be discerned. In one implementation, the summarization model 314 is an LLM that is fine-tuned using DP on each cluster of embedding vectors. The LLM is prompted by the cluster summarization unit 312 to generate a plurality of synthetic representative data points that represent embedding vectors associated with each cluster. The LLM is then prompted by the cluster summarization unit 312 to summarize the synthetic representative data points to generate the theme for the cluster. In another implementation, the summarization model 314 is an LLM that is fine-tuned using DP on each cluster of embedding vectors as in the preceding example implementation. In this implementation, the theme is generated by prompting the LLM to summarize the DP n-grams associated with each of the clusters. In other implementations, the themes are generated by applying a differentially private n-gram algorithm to each cluster. Other implementation may utilize other techniques for generating the themes.

The summarization model 314 uses personal identifiable information (PII) scrubbing in some implementations to ensure that the themes associated with each cluster are anonymous and do not include any information that can be attributed to a particular prompt provided by a particular user. Various PII scrubbing techniques can be implemented by the summarization model 314, including but not limited to data masking in which elements of the dataset included in the cluster are replaced, by data deletion in which some elements of the dataset are deleted, and/or data generalization in which the data included in the element is generalized. The generalization may be performed using an LLM, such as the LLM 138, to generate the generalization of the cluster values.

The summarization model 314 uses k-user anonymization in some implementations to ensure that the themes associated with each cluster are anonymous and do not include any information that can be attributed to a particular prompt provided by a particular user. The k-user anonymization algorithms group similar individual together, such as the elements of one of the clusters of embedding vectors, and suppresses user-specific data. The user-specific data anonymized by suppressing any user-specific identifiers and by perturbing the output.

In some implementations, the prompt may include multiple chained utterances. In some implementations, the application services platform 110 supports native applications 114 and/or web applications 190 that enable the user to communicate with the language model 138 using a series of chained utterances or prompts that enable the user to collaborate with the language model 138 to further refine the results provided the by language model 138. In such implementations, the embeddings unit 302 of the prompt analysis unit 206 provides the chain of utterances as a prompt to the summarization model 314 to obtain a summary of the chained utterances. The summary is then used by the embeddings unit 302 to generate embeddings in a similar manner as the singular text prompts obtained from the privacy preserving datastore 204.

Figure 4:
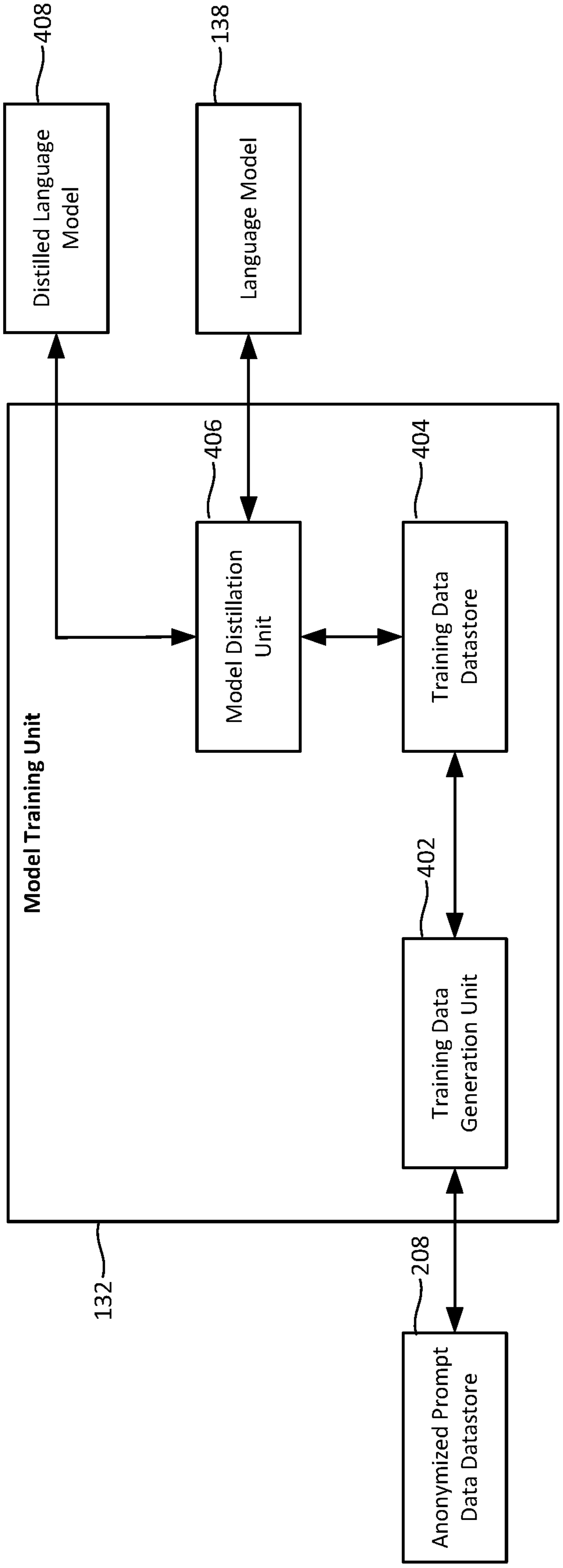
FIG. 4 is a diagram showing an example implementation of the model training unit of the application services platform shown in FIG. 1.

FIG. 4 is a diagram showing an example implementation of the model training unit 132 of the application services platform shown in FIG. 1. The model training unit 132 includes a training data generation unit 402, a training data datastore 404, and a model distillation unit 406. The model training unit 132 can be used to refine the training of the language model 138 and/or distill a child model, such as the distilled language model 408, from the language model 138.

The training data generation unit 402 obtains anonymized data from the anonymized prompt data datastore 208. The anonymized prompt data datastore 208 includes the anonymized data that was generated by the prompt anonymization pipeline 124. Using this data to refine the training of the language model 138 and/or to distill the distilled language model 408 without incorporating any private user data in the training data. The training data generation unit 402 stores the training data in the training data datastore 404. The training data datastore 404 is stored in a persistent memory of the application services platform 110.

The model distillation unit 406 can train the distilled language model 408 to behave similarly to the language model 138 using the training data from the training data datastore 404. The distilled language model 408 is a smaller model than the language model 138. Therefore, the distilled language model 408 requires fewer computing resources to execute but provides similar performance as the language model 138.

The model distillation unit 406 can use various techniques to train the distilled language model 408. In some implementations, the language model 408 and the distilled language model 408 are trained using labeled training data from the training data datastore 404 that was generated from the anonymized prompt data of the anonymized prompt data datastore 208. The embeddings vector output by the language model 138 is compared with the embeddings output by the distilled language model 408 using a loss function. During the training process, the model distillation unit 406 attempts to minimize the loss function to reduce differences between the output from the language model 138 and the distilled language model 408. The behavior of the distilled language model 408 can be adjusted through backpropagation in some implementations, which adjusts the weights and biases based on the loss calculated for the outputs of the language model 138 and the distilled language model 408.

FIG. 5 is a diagram showing an example implementation of the prompt data insight unit 144 of the application services platform shown in FIG. 1. The prompt data insight unit 144 provides tools that model developers can use to understand how users are utilizing the language model 138. The data visualization unit 502 provides a user interface that enables users to query the anonymized prompt data datastore 208 of the prompt anonymization pipeline 124 and to generate visualization and/or reports indicating the types of prompts that users are submitting to the language model 138. The data has been anonymized by the prompt anonymization pipeline 124 as discussed in the preceding examples. Consequently, no sensitive user data is exposed to the model developers, but the developers are still able to obtain information indicative of how the model is being used. A technical benefit of this privacy preserving approach is that the model developers can then customize features of the services provided by the application services platform 110 to better serve the needs of the user based on their usage behavior. The data visualization unit 502 is also configured to generate reports that can be stored in the usage reporting datastore 504. Other implementations of the prompt data insight unit 144 may include additional tools for analyzing the anonymized prompt data and utilizing this data to improve the services provided by the application services platform 110 and/or provide additional services.

FIG. 6A is a flow chart of an example process 600 for generating privacy protecting insights into how users are utilizing a language model, such as the language model 138.

The process 600 is implemented by the prompt anonymization pipeline 124 in some implementations. As discussed in the preceding examples, the prompt anonymization pipeline 124 is configured to store the prompts that users submit to the language model in the privacy preserving datastore 204 to ensure that the prompt data is inaccessible from outside of the privacy preserving datastore 204. The data is anonymized within the privacy preserving datastore 204 and anonymized data is generated and output from the privacy preserving datastore 204 and stored in the anonymized prompt data datastore 208. A technical benefit of this approach is that the model developers are unable to access the prompt information stored in the privacy preserving datastore 204 to ensure that the privacy of the users submitting the prompts to the language model 138 is preserved. However, the model developers are still able to obtain useful insights into how the language model 138 is being utilized through the anonymized data generated by the prompt anonymization pipeline 124. As discussed in the preceding examples, the anonymized prompt data can be used to improve the provided by the language model 138, to distill child models from the language model 138 that perform similarly to the language model 138 but require significantly fewer computing resources to operate. The anonymized data can also be used to provide other services that can be used to improve the user experience.

The process 600 includes an operation 602 of receiving a plurality of natural language prompts for a first language model 138. Users may submit prompts to the language model 138 via the native application 114 or the web application 190. The prompt is provided to the request processing unit 122, which processes the request and provides the prompt to the language model 138 for processing. The request processing unit 122 also provides the prompts that are received to the prompt anonymization pipeline 124 for processing.

The process 600 includes an operation 604 storing the plurality of natural language prompts in a privacy protecting datastore in which the natural language prompts are inaccessible from outside of the privacy protecting datastore once stored in the privacy protecting datastore. The prompt information is stored in the privacy preserving datastore 204 to ensure that developers and/or other human users are unable to access the prompt data in its original, non-anonymized form to ensure that the privacy of the users providing the prompts to the language model 138 is preserved.

The process 600 includes an operation 606 analyzing the natural language prompts stored in the privacy protecting datastore to generate embedding vectors representing the plurality of natural language prompts and an operation 608 storing the embedding vectors in the privacy protecting datastore. The prompt data analysis unit 206 analyzes the prompt information in the privacy preserving datastore 204 using the embeddings language model 304 to generate the embedding vectors representing the prompts. The embeddings vectors are stored in the privacy preserving datastore 204 by the embeddings unit 302 to ensure that the embeddings are not accessible to the model developers or other users.

The process 600 includes an operation 610 analyzing the embedding vectors using a clustering algorithm to generate clusters of related embedding vectors in the privacy protecting datastore. The data clustering unit 308 of the prompt data analysis unit 206 analyzes the embedding vectors using one or more clustering algorithms 310. The clustering algorithms group embedding vectors representing user prompts into groups having similar characteristics.

The process 600 includes an operation 612 generating, for each cluster of at least a subset of the clusters of related embedding vectors, theme information summarizing the embedding vectors of the cluster. The clusters are summarized using the summarization model 314, which is a language model configured to analyze the vector embeddings associated with a cluster and to output theme information that summarizes the subject of the cluster. The theme information provides an anonymized, privacy protecting representation of the prompts associated with the cluster without revealing any sensitive user information.

The process 600 includes an operation 614 storing the theme information associated with each cluster of the plurality of clusters in a second datastore outside of the privacy protecting datastore, the second datastore being accessible for querying the data stored therein. The anonymized data is output by the prompt data analysis unit 206 into the anonymized prompt data datastore 208. The anonymized prompt data datastore 208 includes the anonymized data generated as discussed above. The information included in the anonymized prompt data datastore 208 can be used to distill a child language model as discussed in the preceding examples. The information in the anonymized prompt data datastore 208 can also be used to generate data visualizations and/or reports for model developers and/or other users to obtain an understanding of how users are utilizing the language model 138. This information can be used to provide feedback to the language model 138 to improve the predictions provided by the model and/or to generate other software and/or content that leverages the typical use cases for the language model 138.

FIG. 6B is a flow chart of another process 670 for generating privacy protecting insights into how users are utilizing a language model, such as the language model 138. The process 600 is implemented by the prompt anonymization pipeline 124 in some implementations.

The process 670 includes an operation 672 of receiving natural language prompts for a first language model. The language model 138 can implement the first language model. Users may submit prompts to the language model 138 via the native application 114 or the web application 190. The prompt is provided to the request processing unit 122, which processes the request and provides the prompt to the language model 138 for processing. The request processing unit 122 also provides the prompts that are received to the prompt anonymization pipeline 124 for processing.

The process 670 includes an operation 674 of processing the natural language prompts using prompt anonymization pipeline configured to store the natural language prompts in a datastore that is inaccessible from outside of the prompt anonymization pipeline, the prompt anonymization pipeline being configured to anonymize the natural language prompts in the datastore according to the operations 676, 678, 680, and 682.

The process 670 includes an operation 676 of generating embeddings for the natural language prompts. The embeddings are generated using the embeddings language model 304 in some implementations as discussed in the preceding examples.

The process 670 includes an operation 678 of analyzing the embeddings using a clustering algorithm to identify clusters of related natural language prompts. In some implementations, the data clustering unit 308 of the prompt analysis unit 206 uses the clustering algorithms 310 to generate the clusters. Each cluster is determined based on a how close the embedding vectors associated with each prompt are to one another within the embedding space. The clusters are determined by selecting vectors which are within a threshold distance of one another. Various clustering algorithms can be used to implement the clustering operation.

The process 670 includes an operation 680 of analyzing at least a subset of the clusters using a third language model trained to summarize the subject matter of the embeddings into a theme associated with the cluster. The summarization model 314 implements the third language model in some implementations. The third language model generates a summary of the subject matter of the cluster referred to as a "theme" for the cluster. This theme information is anonymized to protect the privacy of the users whose natural language prompts were included in the cluster.

The process 670 includes an operation 682 of storing the theme associated with each cluster of the at least a subset of the clusters in an anonymized prompt datastore 208. The anonymized prompt datastore 208 only includes data that has been anonymized and provides support for executing queries for retrieving specific subsets of the anonymized prompt data.

The process 670 includes an operation 684 of receiving a query for anonymized prompt information from a client device 105 an operation 684 of executing the query on the anonymized prompt datastore 208 to obtain query results. As discussed with respect to FIG. 2, the prompt anonymization pipeline 124 is configured to receive queries from the native application 114 and/or the web application 190. The query is executed on the anonymized prompt data datastore 208.

The process 670 includes an operation 684 of providing the query results to the client device 105. The request processing unit 122 of the application services platform 110 receives the query results from the prompt anonymization pipeline 124 and sends the query results to the client device 105 over a network connection.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
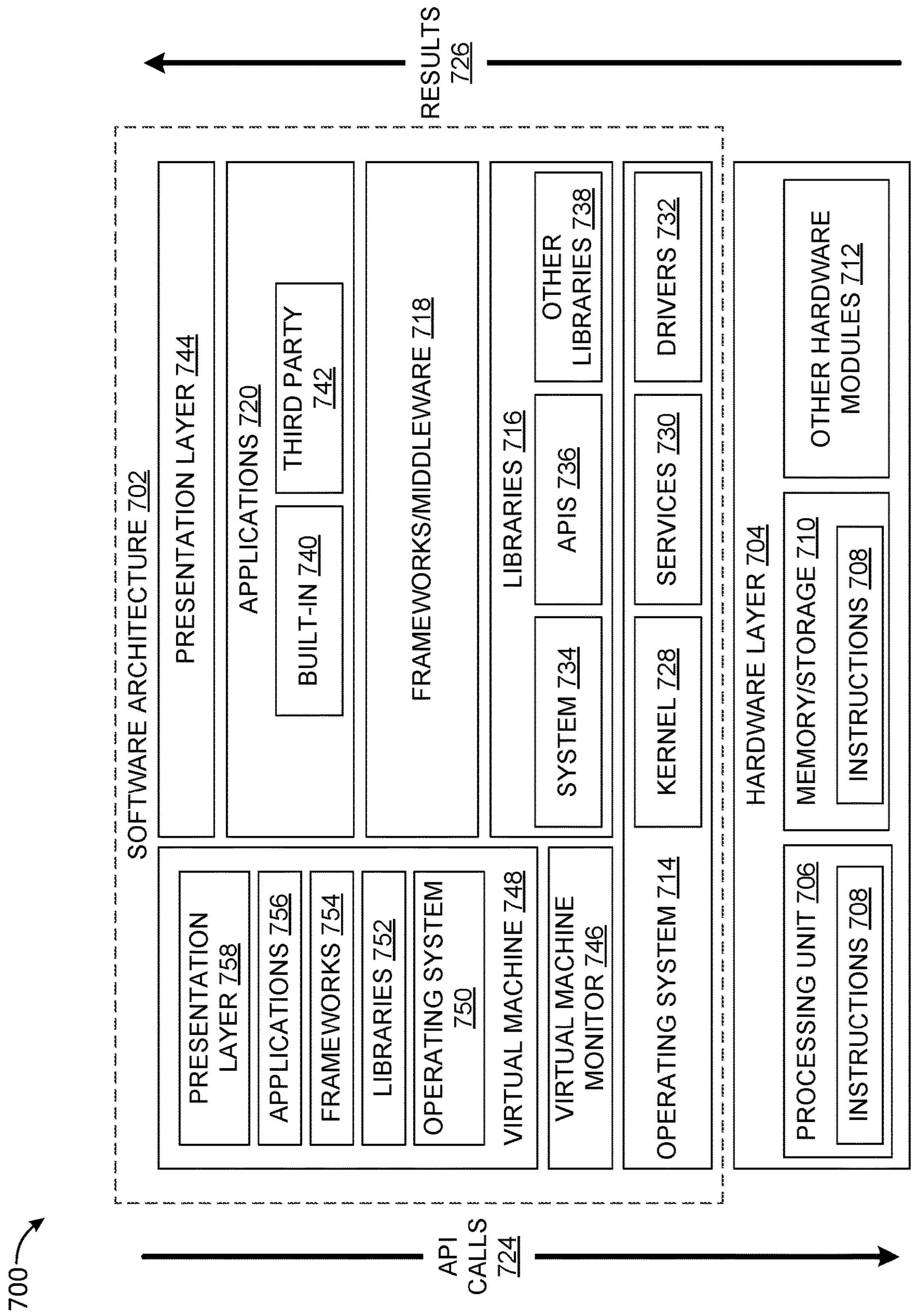
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
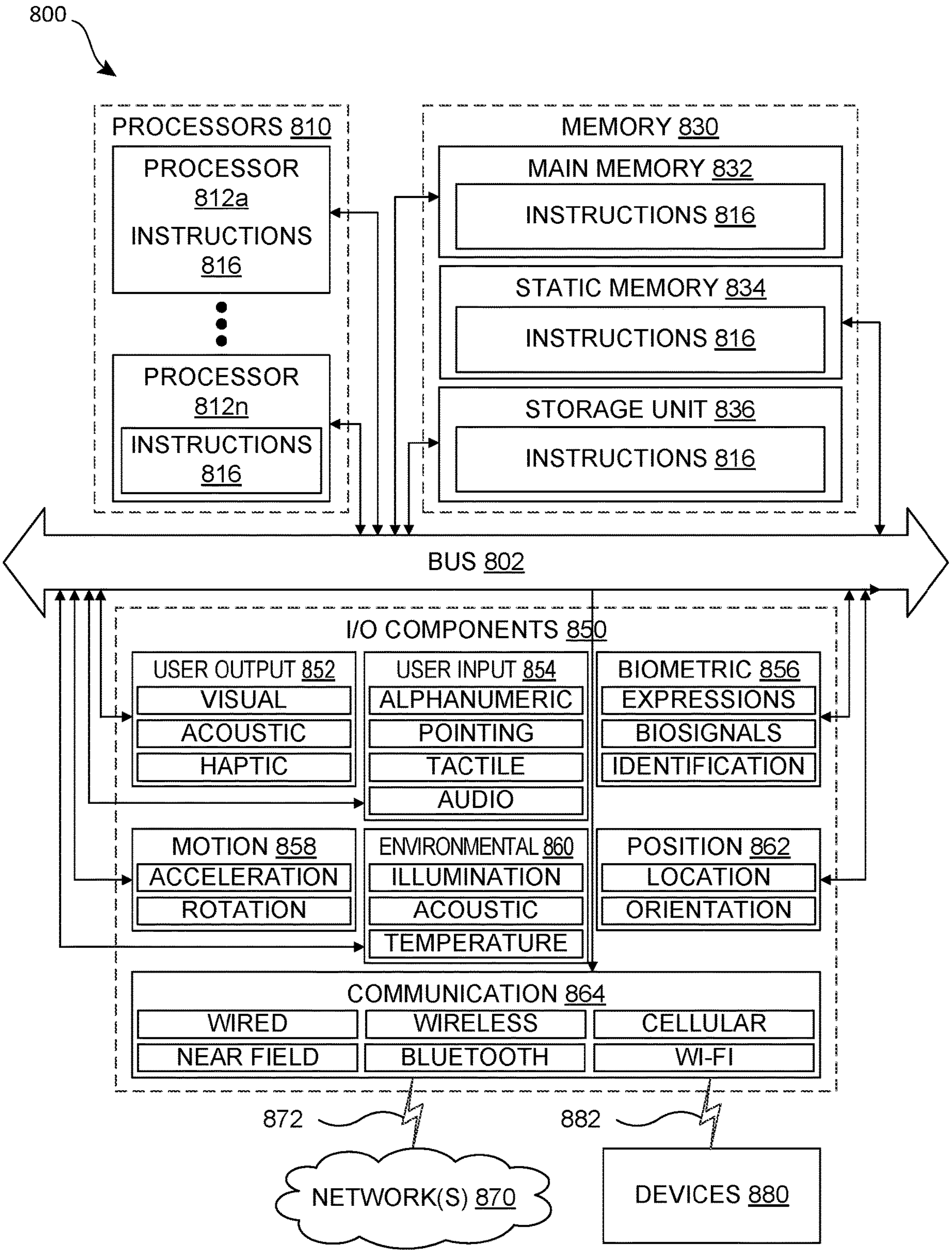
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:

a processor; and a machine-readable storage medium storing executable instructions that, when executed, cause the processor alone or in combination with other processors to perform operations of:

receiving a plurality of natural language prompts for a first language model;

storing the plurality of natural language prompts in a privacy protecting datastore in which the plurality of natural language prompts are inaccessible from outside of the privacy protecting datastore once stored in the privacy protecting datastore;

analyzing the plurality of natural language prompts stored in the privacy protecting datastore to generate embedding vectors representing the plurality of natural language prompts;

storing the embedding vectors in the privacy protecting datastore;

analyzing the embedding vectors using a clustering algorithm to generate clusters of related embedding vectors in the privacy protecting datastore;

generating, for each cluster of at least a subset of the clusters of related embedding vectors, theme information summarizing the embedding vectors of the cluster by:

fine-tuning a large language model (LLM) with differential privacy on each cluster of the at least a subset of clusters;

prompting the LLM to generate a plurality of synthetic representative data points associated with each cluster; and prompting the LLM to generate the theme information for each cluster by summarizing the plurality of synthetic representative data points; and storing the theme information associated with each cluster of the at least a subset of clusters in a second datastore outside of the privacy protecting datastore, the second datastore being accessible for querying data stored therein.

2. The data processing system of claim 1, wherein analyzing the plurality of natural language prompts to generate the embedding vectors further comprises analyzing the embedding vectors using a second language model is configured to extract features from the plurality of natural language prompts and to generate an embedding vector comprising a numerical representation of the features included in the plurality of natural language prompts.

3. The data processing system of claim 1, wherein generating, for each cluster of at least the subset of the clusters of related embedding vectors, the theme information summarizing the embedding vectors of the cluster further comprises selecting clusters that comprise at least a threshold number of embedding vectors to include in the at least the subset of the clusters.

4. The data processing system of claim 1, wherein analyzing the embedding vectors using the clustering algorithm to generate the clusters of related embedding vectors further comprises a k-means clustering algorithm that partitions the embedding vectors into k clusters in which each embedding vector belongs to a cluster having a nearest mean to the embedding vector, wherein k is an integer greater than 2.

5. The data processing system of claim 1, wherein generating the theme information for each cluster further comprises:

applying a differentially private n-gram algorithm to each cluster.

6. A data processing system comprising:

a processor; and a machine-readable storage medium storing executable instructions that, when executed, cause the processor alone or in combination with other processors to perform operations of:

receiving a plurality of natural language prompts for a first language model including receiving a first prompt that includes multiple chained utterances from a chat interface;

storing the plurality of natural language prompts in a privacy protecting datastore in which the plurality of natural language prompts are inaccessible from outside of the privacy protecting datastore once stored in the privacy protecting datastore;

prompting a third language model to generate a summary of the first prompt;

storing the summary of the first prompt with the plurality of natural language prompts in the privacy protecting datastore;

analyzing the plurality of natural language prompts stored in the privacy protecting datastore to generate embedding vectors representing the plurality of natural language prompts;

storing the embedding vectors in the privacy protecting datastore;

analyzing the embedding vectors using a clustering algorithm to generate clusters of related embedding vectors in the privacy protecting datastore;

generating, for each cluster of at least a subset of the clusters of related embedding vectors, theme information summarizing the embedding vectors of the cluster; and storing the theme information associated with each cluster of the at least a subset of clusters in a second datastore outside of the privacy protecting datastore, the second datastore being accessible for querying data stored therein.

7. The data processing system of claim 1, wherein the machine-readable storage medium further includes instructions configured to cause the processor alone or in combination with other processors to perform operations of:

generating training data for a child language model derived from the first language model based on the theme information associated with each cluster of the at least a subset of clusters in the second datastore; and training the child language model to make predictions similar to the first language model based on the training data.

8. A method implemented in a data processing system for anonymizing prompts to a language model, the method comprising:

receiving a plurality of natural language prompts for a first language model;

storing the plurality of natural language prompts in a privacy protecting datastore in which the at least a subset natural language prompts are inaccessible from outside of the privacy protecting datastore once stored in the privacy protecting datastore;

analyzing the plurality of natural language prompts stored in the privacy protecting datastore to generate embedding vectors representing the plurality of natural language prompts;

storing the embedding vectors in the privacy protecting datastore;

analyzing the embedding vectors using a clustering algorithm to generate clusters of related embedding vectors in the privacy protecting datastore;

generating, for each cluster of at least a subset of the clusters of related embedding vectors, theme information summarizing the embedding vectors of the cluster by:

fine-tuning a large language model (LLM) with differential privacy on each cluster of the at least a subset of clusters;

prompting the LLM to generate a plurality of synthetic representative data points associated with each cluster; and prompting the LLM to generate the theme information for each cluster by summarizing the plurality of synthetic representative data points; and storing the theme information associated with each cluster of the at least a subset of clusters in a second datastore outside of the privacy protecting datastore, the second datastore being accessible for querying data stored therein.

9. The method of claim 8, wherein analyzing the plurality of natural language prompts to generate the embedding vectors further comprises analyzing the embedding vectors using a second language model is configured to extract features from the plurality of natural language prompts and to generate an embedding vector comprising a numerical representation of the features included in the plurality of natural language prompts.

10. The method of claim 8, wherein generating, for each cluster of at least the subset of the clusters of related embedding vectors, the theme information summarizing the embedding vectors of the cluster further comprises selecting clusters that comprise at least a threshold number of embedding vectors to include in the at least the subset of the clusters.

11. The method of claim 8, wherein analyzing the embedding vectors using the clustering algorithm to generate the clusters of related embedding vectors further comprises a k-means clustering algorithm that partitions the embedding vectors into k clusters in which each embedding vector belongs to a cluster having a nearest mean to the embedding vector, wherein k is an integer greater than 2.

12. The method of claim 8, wherein generating the theme information for each cluster further comprises:

applying a differentially private n-gram algorithm to each cluster.

13. A method implemented in a data processing system for anonymizing prompts to a language model, the method comprising:

receiving a plurality of natural language prompts for a first language model including receiving a first prompt that includes multiple chained utterances from a chat interface;

storing the plurality of natural language prompts in a privacy protecting datastore in which the plurality of natural language prompts are inaccessible from outside of the privacy protecting datastore once stored in the privacy protecting datastore;

prompting a third language model to generate a summary of the first prompt;

storing the summary of the first prompt with the plurality of natural language prompts in the privacy protecting datastore;

analyzing the plurality of natural language prompts stored in the privacy protecting datastore to generate embedding vectors representing the plurality of natural language prompts;

storing the embedding vectors in the privacy protecting datastore;

analyzing the embedding vectors using a clustering algorithm to generate clusters of related embedding vectors in the privacy protecting datastore;

generating, for each cluster of at least a subset of the clusters of related embedding vectors, theme information summarizing the embedding vectors of the cluster; and storing the theme information associated with each cluster of the at least a subset of clusters in a second datastore outside of the privacy protecting datastore, the second datastore being accessible for querying data stored therein.

14. The method of claim 8, further comprising:

generating training data for a child language model derived from the first language model based on the theme information associated with each cluster of the at least the subset of clusters in the second datastore; and training the child language model to make predictions similar to the first language model based on the training data.

15. A data processing system comprising:

a processor; and a machine-readable storage medium storing executable instructions that, when executed, cause the processor alone or in combination with other processors to perform operations of:

receiving natural language prompts for a first language model;

processing the natural language prompts using a prompt anonymization pipeline configured to store the natural language prompts in a datastore that is inaccessible from outside of the prompt anonymization pipeline, the prompt anonymization pipeline being configured to anonymize the natural language prompts in the datastore by:

generating embeddings for the natural language prompts providing a numerical representation of the natural language prompts;

analyzing the embeddings using a clustering algorithm to identify clusters of related natural language prompts;

analyzing at least a subset of the clusters of related natural language prompts using a third language model trained to summarize subject matter of the embeddings into a theme associated with the cluster; and storing the theme associated with each cluster of the at least the subset of the clusters in an anonymized prompt datastore;

receiving a query for anonymized prompt information from a client device;

executing the query on the anonymized prompt datastore to obtain query results; and providing the query results to the client device.

16. The data processing system of claim 15, wherein analyzing at least the subset of the clusters using a third language model trained to summarize subject matter of the embeddings into the theme further comprises selecting clusters that comprise at least a threshold number of embedding vectors to include in the at least the subset of the clusters.

17. The data processing system of claim 15, wherein analyzing the embeddings using the clustering algorithm to identify the clusters of related natural language prompts further comprises a k-means clustering algorithm that partitions the embeddings into k clusters in which each embedding belongs to a cluster having a nearest mean to the embedding, wherein k is an integer greater than 2.

18. The data processing system of claim 15, wherein the machine-readable storage medium further includes instructions configured to cause the processor alone or in combination with other processors to perform operations of:

generating training data for a child language model derived from the first language model based on the theme associated with each cluster of the subset of clusters in a second datastore; and training the child language model to make predictions similar to the first language model based on the training data.

* * * * *